Feb. 11, 1958  A. C. DONOVAN  2,822,978
SIMPLIFIED ALTERNATING CURRENT RATE CIRCUIT
Filed June 11, 1953  3 Sheets-Sheet 1
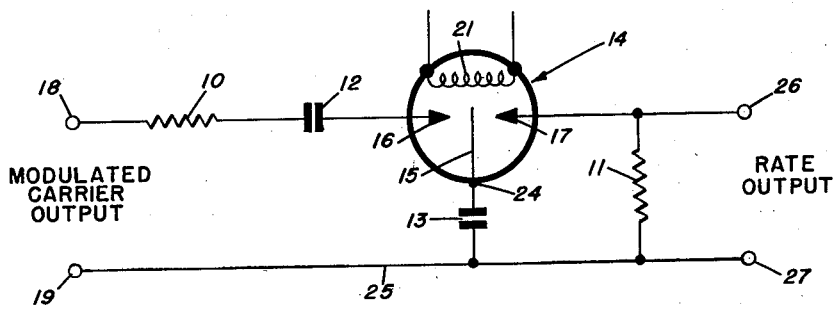
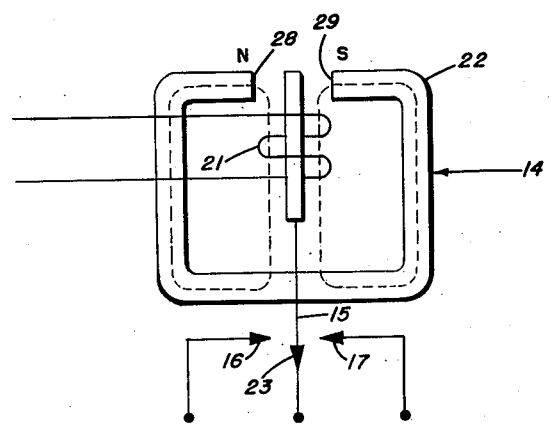
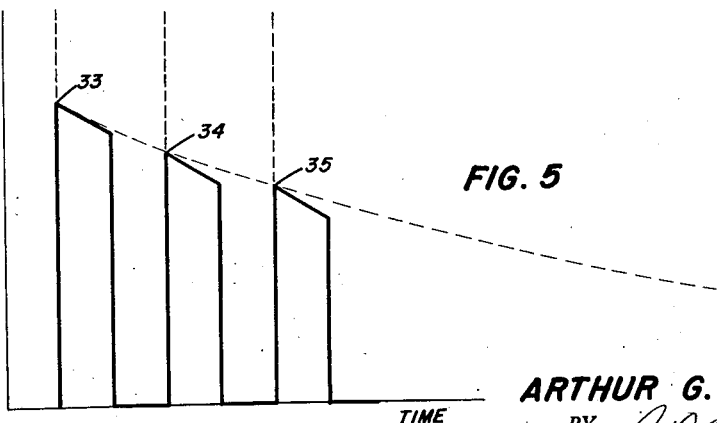
INVENTOR.
ARTHUR G. DONOVAN
BY
ATTORNEYS Feb. 11, 1958  A. C. DONOVAN  2,822,978
SIMPLIFIED ALTERNATING CURRENT RATE CIRCUIT
Filed June 11, 1953  3 Sheets-Sheet 2

INVENTOR.
ARTHUR G. DONOVAN
BY
ATTORNEYS

Feb. 11, 1958    A. C. DONOVAN    2,822,978
SIMPLIFIED ALTERNATING CURRENT RATE CIRCUIT
Filed June 11, 1953    3 Sheets-Sheet 3

INVENTOR.
ARTHUR G. DONOVAN
BY
ATTORNEYS

United States Patent Office 2,822,978
Patented Feb. 11, 1958

2,822,978
SIMPLIFIED ALTERNATING CURRENT RATE CIRCUIT

Arthur C. Donovan, Milton, Mass., assignor, by mesne assignments, to the United States of America as represented by the Secretary of the Navy Application June 11, 1953, Serial No. 360,934

6 Claims. (Cl. 235—61)

This invention relates to alternating current rate circuits and more particularly to a differentiating circuit which produces an output voltage substantially in proportion to the rate of change of the input voltage and is especially useful in connection with alternating current servo-mechanisms commonly employed in numerous types of regulating and control devices.

In many different types of electrical circuits such, for example, as those used in servo-mechanism devices, a modulated alternating current carrier type of signal is employed in which the carrier voltage alternates at a particular frequency although the amplitude thereof varies proportionally to the magnitude of the signal being carried upon it, and the carrier corresponds in sense to the sense of the signal, the sense of the signal determining whether the phase of the carrier will be in one direction or in the opposite.

It is often necessary or desirable in many electrical circuits employing a modulated alternating current carrier type signal to determine the rate or derivative of the modulated carrier.

Heretofore this problem has been solved by first demodulating the modulated carrier to thereby obtain the modulation envelope thereof, then passing the modulation envelope through one of the conventional networks capable of taking a derivative of a unidirectional, slowly varying voltage, and finally remodulating the derived voltage upon the carrier frequency. As will become more clearly apparent as the description proceeds, the present invention greatly simplifies the problem of obtaining the rate or derivative of a modulated carrier as well as requiring fewer components as compared with the conventional equipment for achieving such a result.

With the foregoing in mind it is an object of this invention to provide a differentiating circuit capable of modifying the character of the modulation of a modulated alternating current carrier type signal after it has been impressed upon the carrier so as to derive the rate of the modulated carrier.

Another object of the present invention resides in the provision of a rate circuit comprising a minimum of components and which will tolerate approximately 15% change in carrier frequency without adverse effect upon its performance.

Still another object is the provision of a simplified alternating current rate circuit notably adapted for connection in alternating current servo-mechanism feedback loops.

Yet another object of the instant invention resides in the provision of a simplified alternating current rate network requiring a minimum of components and capable of adding proportional and derivative signals.

Other objects and many of the attendant advantages of this invention will be readily appreciated as the same becomes better understood by reference to the following detailed description when considered in connection with the accompanying drawings wherein:

Fig. 1 is a circuit diagram of the simplified rate circuit of the present invention;

Fig. 2 is a diagrammatic illustration of a chopper switch which may be employed in the alternating current rate circuit of the present invention;

Fig. 5 illustrates the output wave form and indicates that the peaks thereof are on an exponential decay curve;

Figure 3:
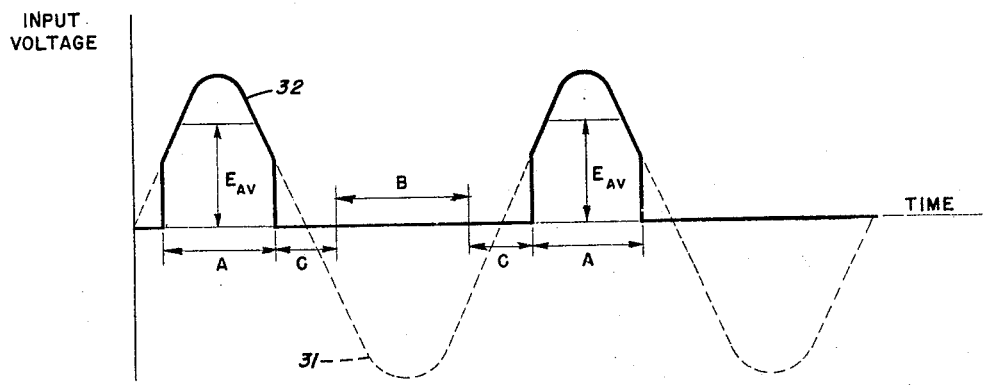
Fig. 3 illustrates the character of the input wave form before and after action by the chopper switch of Fig. 2 when the chopper contact closes in phase with the carrier input.

Referring now to the several figures of the drawings and more particularly to Fig. 1 thereof, it will be observed that the rate circuit of the present invention includes a pair of resistors 10 and 11 and a pair of capacitors 12 and 13 and, in addition, a suitable switch mechanism, generally designated by numeral 14. As illustrated, one type of switch mechanism which has been found to be satisfactory is one of the type known as a chopper switch, best illustrated in Fig. 2, which includes a reed 15 electromagnetically driven so as to make alternate contact with adjacently disposed contact members 16 and 17. Further description of the chopper switch and its operation will appear hereinafter.

Terminals 18 and 19 are connected to the output terminals of a device which delivers a modulated alternating current carrier to the circuitry of the present invention. Resistor 10 and capacitor 12 are connected in series between contact member 16 and terminal 18. The free end of reed 15 carries a magnetic material, this end being disposed in electromagnetic driven relationship with a fixed electromagnetic coil 21 used in conjunction with permanent magnet 22. Coil 21 is connected to the source which supplies the carrier voltage to thereby synchronize switch motion with the frequency and phase of the unmodulated carrier. The intermediate portion of reed carries electrical contact material 23, Fig. 2, disposed for engagement with contact members 16 and 17 when the reed is actuated in one direction or the other. The reed 15, as illustrated in Fig. 1, is pivoted at the lower end thereof for swinging movement between contact members 16 and 17. Pivotal connection 24 is connected to a return lead or conductor 25 by way of capacitor 13. Resistor 11 is connected between contact member 17 and return lead 25. The output voltage across output terminals 26 and 27 is proportional to the rate of change of the input voltage of the modulated carrier across input terminals 18 and 19 as will be more clearly apparent as the description proceeds.

Contact members 16 and 17 of switch 14 are positioned in any desired manner depending upon operating conditions and results to be achieved. However, for purposes of description it will be assumed that contact members 16 and 17 are so positioned that reed 15 makes contact with the input contact member 16 for 70% of a half period of drive voltage when one polarity of the alternating drive voltage increases the strength of pole 28 of magnet 22 while decreasing the strength of pole 29. The remaining 30% of the half period of drive voltage is required to transfer reed 15 to the output contact member 17 when opposite polarity of the drive voltage increases the strength of pole 29 of magnet 22 while decreasing the strength of pole 28.

Any delay which may exist in the phase of the reed amplitude with respect to the driving voltage amplitude may be eliminated by shifting the driving current in phase to obtain any desired phase relation between the position of reed 15 and the driving voltage.

Because chopper switch 14 is closed for 70% of each half period of the applied modulated carrier the input voltage is converted from a pure sinusoidal wave form, as indicated by broken lines 31 in Fig. 3, to a clipped wave form illustrated by solid lines and designated by numeral 32 in this figure. The time interval A in Fig. 3 represents the time during which reed 15 is in contact with contact member 16, the time B represents the time interval during which the reed 15 is in contact with contact member 17, and the time C represents the time interval during which the reed 15 is in contact with neither contact member but is moving from one contact member to the other. Each pulse of the wave form established by the action of chopper switch 14 has an average voltage value of $E_{AV}$.

Figure 4:
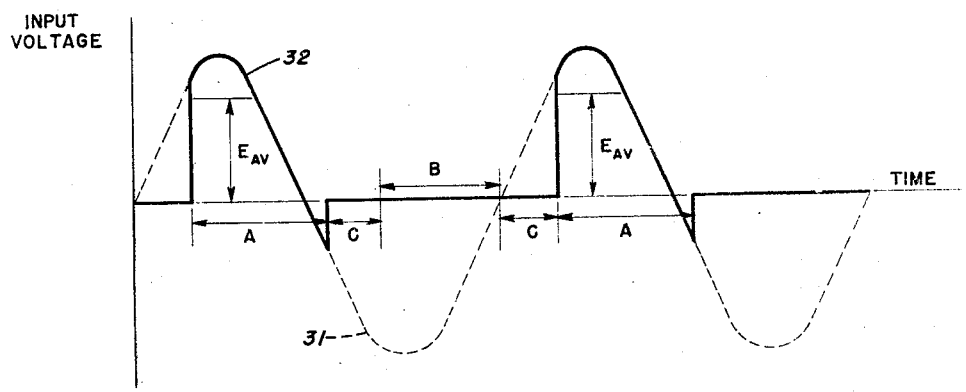
Fig. 4 is a view of the input wave form before and after action of the chopper switch when the latter closes somewhat out of phase with the carrier input.

The charges acquired on capacitors 12 and 13 by reason of the transmission of the carrier pulse during the time interval while reed 15 is closed on contact member 16 are related to the pulse average voltage $E_{AV}$ in either Fig. 3 or Fig. 4 so long as the input circuit time constant is small compared to the period of conduction through contact member 16. The foregoing statement that the charges acquired on capacitors 12 and 13 are related to the pulse average voltage $E_{AV}$ is also true although the contact 15 closes somewhat out of phase with the carrier input as illustrated in Fig. 4. In other words, regardless of the wave form of any particular pulse, it is the value of the average voltage of the pulse which is effective in charging the capacitors, provided that the input circuit time constant is short compared with the charging time of the capacitors.

When reed 15 is actuated to a position out of engagement with contact member 16 after each charging period is completed, the total voltage on capacitor 13 consists of the residual voltage remaining thereon at the end of the previous discharge period at the instant when reed 15 was disengaged from contact member 17 plus the voltage thereafter acquired from a circulation of charge from the input side of the circuit when reed 15 was actuated to a position of engagement with contact member 16.

The output wave shape during the first three discharge cycles resembles the generally saw tooth configuration disclosed in Fig. 5. The peaks of the output wave shape are on an exponential decay curve, each succeeding cycle being reduced below the amplitude of the preceding cycle by the constant factor of $$\frac{V_{33}}{E_{AV}}\left(1-e^{\frac{-T}{R_BC_B}}\right)+e^{\frac{-T}{R_BC_B}}$$

so that peak 33 of the first discharge cycle, peak 34 of the second discharge cycle, and peak 35 of the third discharge cycle respectively may be mathematically expressed as follows:

$$V_{33}=E_{AV}\frac{C_A}{C_A+C_B}$$

$$V_{34}=E_{AV}\frac{C_A}{C_A+C_B}\left[\frac{C_A}{C_A+C_B}\left(1-e^{\frac{-T}{R_BC_B}}\right)+e^{\frac{-T}{R_BC_B}}\right]$$

$$V_{35}=E_{AV}\frac{C_A}{C_A+C_B}\left[\frac{C_A}{C_A+C_B}\left(1-e^{\frac{-T}{R_BC_B}}\right)+e^{\frac{-T}{R_BC_B}}\right]^2$$

where $E_{AV}$ = the afore-mentioned average voltage;
$C_A$ = capacitance of capacitor 12;
$C_B$ = capacitance of capacitor 13;
$T$ = closure time of reed 15 upon contact member 17; and
$R_B$ = resistance of resistor 11.

The time constant for the afore-mentioned decay curve may be expressed as follows:

$$TC=\frac{P}{\log_e 1/\left[\frac{C_A}{C_A+C_B}\left(1-e^{\frac{-T}{R_BC_B}}\right)+e^{\frac{-T}{R_BC_B}}\right]}$$

where P is the period of the alternating current.

The response of the alternating current network of the present invention corresponds to the response of the direct current rate network in which the frequency dependent portion of the performance function thereof is as follows:

$$(PF)_{D.C.}=\frac{pT_{D.C.}}{pT_{D.C.}+1}$$

where $p$ is the La Place operator.

In the case of the alternating current rate network of the present invention, the frequency dependent portion of the transfer function is given as follows:

$$(PF)_{A.C.}=\frac{pT_{A.C.}}{pT_{A.C.}+1}$$

It will be understood that $T_{AC}$ is equal to the circuit time constant (TC).

It will be noted that the output wave shape as disclosed in Fig. 5 or response of the network to a step input is an exponentially decaying train of rectangular waves with sloping tops and not a train of sinusoidal waves. The rectangular wave shape is usable without modification to a sinusoidal wave shape in most servo-mechanism applications. However, in the event that such modification is required, this can be readily accomplished.

Figure 6:
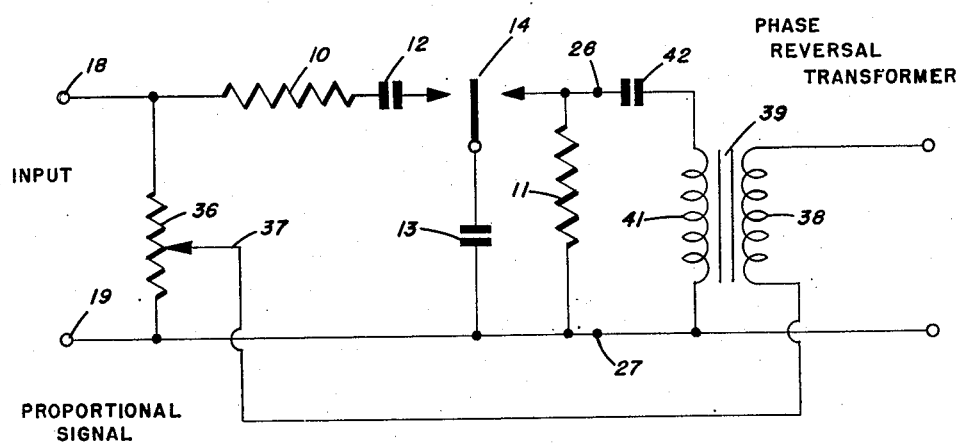
Fig. 6 illustrates the manner in which the circuitry of the present invention may be employed for the series adding of proportional and rate signals.

As illustrated in Fig. 6, it will be observed that the rate network of the present invention may also be advantageously employed for adding a proportional signal to the rate signal by means of a potentiometer 36 connected between the input terminals 18 and 19 with the slide wire 37 thereof being connected to the secondary winding 38 of a phase reversal transformer, generally designated by numeral 39. The primary winding 41 of transformer 39 is connected in series with a coupling capacitor 42 across the output terminals 26 and 27 of the rate circuit as illustrated in Fig. 1.

Figure 7:
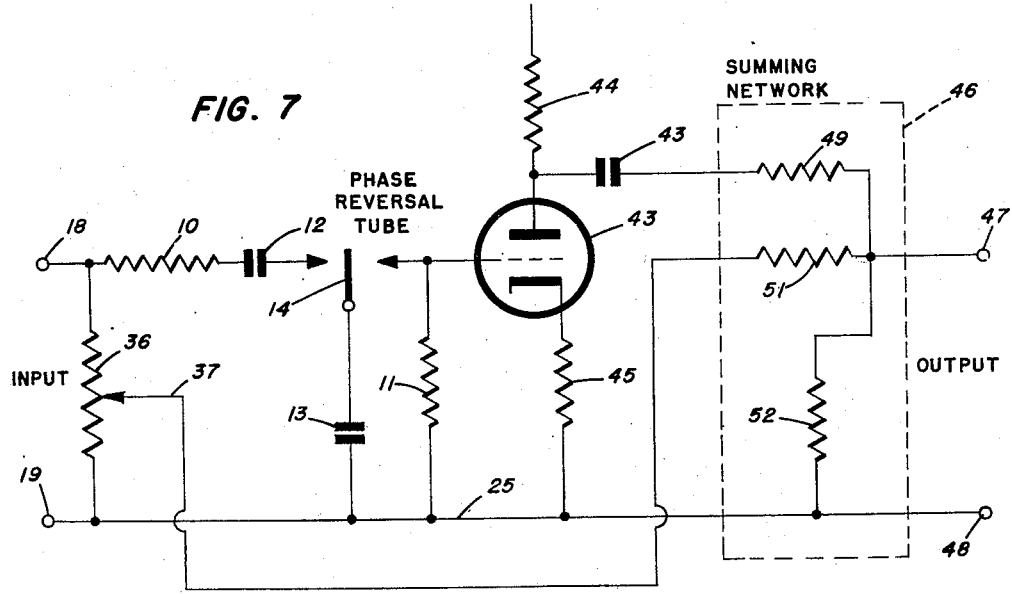
Fig. 7 illustrates the manner in which the present invention may be employed for shunt adding of proportional and rate signals.

Reference is now made to Fig. 7 wherein is disclosed the manner of shunt adding proportional and rate signals. A phase reversal tube 43 having plate resistance 44 and cathode resistance 45 is connected between resistor 11 and capacitor 43. Plate resistor 44 is connected to and controlled by a portion of the unmodulated carrier and cathode resistor 45 is connected to the return lead 25. A suitable summing network generally referred to by reference numeral 46 may be connected between the output terminals 47 and 48 in such a manner that capacitor 43 is connected by resistor 49 to the output terminal 47 and potentiometer 36 is connected by resistor 51 to output terminal 47. Resistor 52 is connected between the output terminals 47 and 48.

Although there are numerous ways in which the present invention may be employed, it has, by way of example, been satisfactorily and advantageously used to derive an acceleration feedback signal from an alternating current tachometer which measures the output shaft velocity in a servo mechanism. This manner of employing the rate circuit herein disclosed has resulted in a simplified alternating current servo-mechanism of high performance requiring only five vacuum tubes. The response of this servo-mechanism is uniform out to 15 cycles per second with a peak output power of 7 mechanical watts and a positional error of ⅓ milliradian at a velocity of 2 radians per second.

Briefly summarizing, in many electrical circuits, notably those used in servo-mechanism devices, a modulated alternating current carrier type of signal is present. It is frequently desirable to modify the character of the modulation after it has been impressed upon the carrier, so as to derive the rate or derivative of the modulated carrier. In accordance with the present invention, a switch device of the "chopper" type, as herein disclosed, is driven at carrier frequency and is arranged so that each contact member is closed with the reed of the switch for 70% of each half period, while the remaining 30% of the half period is required for the transfer of the reed of the switch from one contact to the other. Condensers are charged by the transmitted pulses, as determined by the average values of the pulses. The main advantage of this arrangement over the conventional methods for obtaining rate of change of a modulated alternating current input is the smaller number of components required because of the elimination of the need for demodulating the carrier and then taking the derivative of a unidirectional voltage.

It will be understood, of course, that the invention as herein disclosed and described is not limited to a combination of components which includes a particular type of switch, the chopper type switch being illustrated for descriptive purposes only to facilitate the explanation of the theory of the invention. Another type of switch which might satifactorily be employed would comprise a brush assembly and commutator driven by a motor synchronized to the carrier frequency and phase. Other types of switches which are static and employ highly nonlinear circuit elements such as varistors or saturating magnetic materials might also be used instead of the chopper switch illustrated.

Obviously many modifications and variations of the present invention are possible in the light of the above teachings. It is therefore to be understood that within the scope of the appended claims the invention may be practiced otherwise than as specifically described.

What is claimed is:

1. In an alternating current rate network, input and output terminals, a first voltage storage means connected to said input terminals, a second voltage storage means alternately connected to said first storage means and to said output terminals, and means for alternately making and breaking said second storage means from said first storage means and from said output terminals, a modulated-carrier voltage being impressed on said input terminals, said making and breaking means being actuated in accordance with the frequency of the carrier voltage whereby the output voltage of the network is proportional to the rate of change of input voltage.

2. An alternating current rate network as set forth in claim 1 wherein said making and breaking means includes a switch of the chopper type driven at the carrier frequency.

3. In an alternating current rate network, input and output terminals, resistance and capacitance means connected in series to said input terminals, a second capacitance means alternately connected to said first-mentioned capacitance means and to said output terminals, means for alternately making and breaking said second capacitance means from said first-mentioned capacitance means and from said output terminals, and resistance means connected across said second capacitance means when the latter is connected to said output terminals, a modulated-carrier voltage being impressed on said input terminals, said making and breaking means being actuated in accordance with the frequency of the carrier voltage whereby the output voltage of the network is proportional to the rate of change of input voltage.

4. An alternating current rate network as set forth in claim 3 wherein said making and breaking means includes a switch of the chopper type driven at the carrier frequency.

5. An alternating current rate network comprising, in combination, input and output terminals, first resistance and first capacitance means connected in series to said input terminals, a modulated-carrier voltage impressed on said input terminals, a second capacitance means alternately connected to said first capacitance means and to said output terminals, a single-pole, double-throw switch of the chopper type driven at carrier frequency operatively connected from said second capacitance means to said first capacitance means and to said output terminals for making and breaking said second capacitance means from said first capacitance means and from said output terminals in accordance with the frequency and sense of the carrier voltage, and second resistance means connected across said second capacitance means when the latter is connected to said output terminals whereby the output voltage of the network is proportional to the rate of change of input voltage.

6. An adding network for adding proportional and rate signals comprising input and output terminals, a first voltage storage means connected to said input terminals, a modulated-carrier voltage being impressed upon said input terminals, a phase reversal means connected to said output terminals, means for obtaining a signal proportional to said modulated-carrier voltage connected across said input terminals and to said output terminals, a second voltage storage means alternately connected to said first storage means and to said phase reversal means, and means for alternately making and breaking said second storage means from said first storage means and from said phase reversal means, said making and breaking means being actuated in accordance with the frequency and sense of the carrier voltage, and resistant means connected across said second voltage storage means when the latter is connected to said phase reversal means whereby the output voltage of the network is the sum of a voltage representative of the rate of change of the input voltage and a voltage proportional to the input voltage.

References Cited in the file of this patent

UNITED STATES PATENTS

| | | |
|---|---|---|
| 2,067,021 | Roberts | Jan. 5, 1937 |
| 2,584,954 | Williams | Feb. 5, 1952 |
| 2,676,290 | Ciscel | Apr. 20, 1954 |

OTHER REFERENCES

"Electronic Instruments," vol. 21, Radiation Lab. Series, pages 74, 75 and 76, 1948.